Jan. 13, 1942.                L. H. MORIN ET AL                 2,269,953
                    METHOD OF DIE CASTING THERMOPLASTICS
                           Filed April 22, 1939
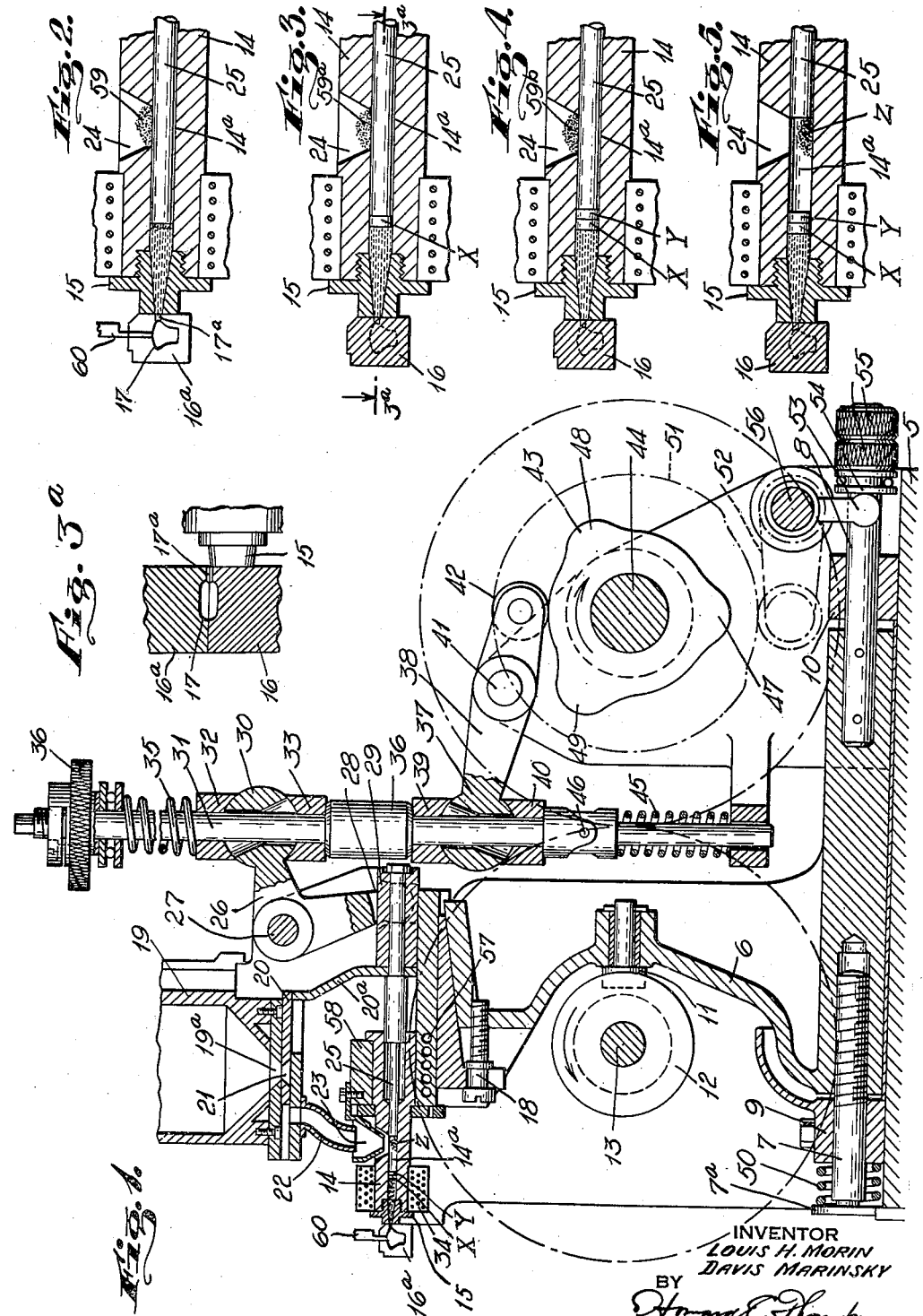
INVENTOR
LOUIS H. MORIN
DAVIS MARINSKY
BY
Howard E. Thompson
ATTORNEY Patented Jan. 13, 1942

2,269,953

UNITED STATES PATENT OFFICE 2,269,953

METHOD OF DIE CASTING THERMO-PLASTICS

Louis H. Morin and Davis Marinsky, Bronx, N. Y.

Application April 22, 1939, Serial No. 269,392

2 Claims. (Cl. 18—55)

This invention relates to the formation of thermoplastic die castings, and more particularly, the invention consists in a method of introducing a series of charges of thermoplastic material into a heated cylinder in advance of the pressure discharge of the heated material from the cylinder into the impression of dies. The novel features of the invention will be best understood from the following description and annexed drawing, in which one embodiment of the invention is disclosed, the separate parts being designated by suitable reference characters in each of the views, and in which:

Fig. 1 is a sectional view through a casting machine employed for carrying our method into effect, and omitting parts of the construction for clearness in illustration.

Fig. 2 is a view similar to Fig. 1 showing only a detail of the construction on an enlarged scale with parts in a different position.

Fig. 3 is a view similar to Fig. 2 showing the next step in the method.

Fig. 3a is a partial section on the line 3a—3a; and,

Figs. 4 and 5 are views similar to Fig. 3, showing further steps of our improved method.

This application constitutes a continuation-in-part of our prior application Ser. No. 131,606, filed March 18, 1937; and the machine, part of which is illustrated in the accompanying drawing, is based on the machine disclosed in our prior application Ser. No. 152,942, filed July 10, 1937, as further exemplified in the machine structure more specifically disclosed in a companion application No. 296,393 filed of equal date herewith.

For the purpose of illustrating one method of carrying our invention into effect, we have shown a portion of a die casting machine; and in Fig. 1 of the drawing, 5 represents a part of the frame work of the machine in which is pivotally supported an oscillating frame 6 on the pivots 7 and 8, the latter being arranged in bearings 9 and 10. The frame 6 carries centrally thereof a roller 11 operating in connection with a cam 12 arranged on the driven shaft 13 so that in each cycle of operation of the machine, the cylinder 14 or the discharge nozzle 15 thereof will be moved from the position shown in Fig. 3a where it is arranged upon the surface of one die part 16, into position between said die part and the companion die part 16a to register with the impression 17 between the adjacent surfaces of the die parts in the injection of the heated casting material into the impression as shown in Fig. 2.

The cylinder 14 is adjustably supported in the upper end of the frame 6 through the means 18 illustrated in Fig. 1, and is movable with the frame as is also a hopper 19 in which the granular or powdered thermoplastic material is stored. Such material as cellulose acetate may be employed. Portions of this material are measured by a feed plate 20 slidable across the lower discharge end 19a of the hopper and having an aperture 21 of a size substantially controlling the size of the charge to be delivered to the cylinder. At 22 is shown a feed pipe associated with the slide 20 and into which the material disposed within the aperture 21, or a portion thereof, is delivered into the pipe 22 for delivery into the cylinder through a cone 23 arranged above an admission port 24 in the cylinder 14. The port 24 is arranged in the cylinder just forwardly of a piston or plunger 25 which reciprocates back and forth in the cylinder. The plunger 25 is actuated by a bell crank 26 pivoted as seen at 27 with one yoke-shaped end 28 thereof engaging a block 29 on the plunger 25 and the other ball end 30 thereof arranged upon a plunger operating rod 31 having a universal mounting between two shoes 32 and 33 on said rod.

The measuring and feed plate 20 is coupled with the plunger 25 through a bracket 20a so that the plate 20 moves with the plunger, and thus, if the forward movement of the plunger 25 should be limited by an excess amount of casting material in the cylinder, then the aperture 21 will not register with the feed tube 22, thus automatically preventing a build-up of material in the cylinder 14. Arranged around the cylinder 14 is an electric heating coil 34 for heating the thermoplastic material introduced into the cylinder. This coil is electrically controlled to provide the proper heating of the material consistent with the speed of operation of the machine and the number of charges thereinto.

Arranged upon the upper end of the rod 31 and cooperating with the shoe 32 is a spring 35, the tension of which may be adjusted through a suitable nut 36. The tension of this spring is sufficient to allow the plunger 25 to yield rearwardly when the forward movement of the plunger is restricted by the material arranged in the cylinder, so that the spring compensates for the varying forward movements of the plunger, notwithstanding the otherwise positive operation thereof through the rod 31 and bell crank 26. The rod 31 has centrally thereof an enlarged portion 36 below which is arranged the ball end 37 of a lever 38 which is arranged between two shoes 39 and 40 on said rod. The lever 38 is pivoted in the frame as seen at 41, and the free end of said lever supports a roller 42 which operates upon a cam 43 arranged on a cam shaft 44, which is driven from the shaft 13. A spring 45 is arranged upon the rod 31 to support the roller 42 in constant engagement with the cam 43 and a suitable universal coupling 46 is provided in the rod 31 to compensate for the swinging movement of the frame 6, which action is also compensated for by the universal ball ends 30, 37, as will be apparent.

In the construction shown, the cam 43 has two slightly enlarged cam surfaces 47, 48, and one greater protruding surface 49. In operation, the surface 47 will feed the first charge, for example at X, into the cylinder. The surface 48 will feed the second charge Y; whereas the surface 49 will feed the last charge Z, and also operate at this moment to pressure discharge heated casting material from the nozzle end 15 of the cylinder into the impression 17 of the die; and then the cycle of operation is repeated. That is, two more charges X and Y are independently advanced in the cylinder, and again in advancing the charge Z, the material is forced into the die impression. In each of the operations, X, Y, and Z, the measuring and feed plate 20 moves forwardly with the plunger and delivers a charge to the aperture 24 of the cylinder upon the top of the plunger 25 which is in its forward position. This charge then drops into the cylinder, after the plunger has been retracted to the position shown in Fig. 1. The particular method of the successive operations herein briefly referred to are illustrated in detail in the description later set forth.

As previously indicated, it will be understood that other forms of cams may be substituted for the cam 43 having a different arrangement of cam surfaces thereon for providing any desired number of charges of the material into the cylinder in advance of the final pressure discharge stroke of the plunger.

In Fig. 1 of the drawing we have indicated at 50 a spring which acts upon a head 7a on the pivot 7 to move the frame 6 or the nozzle 15 of the cylinder 14 supported in said frame, in tensional engagement with the dies during the casting operation. This tension is slightly reduced, for the purpose of avoiding excessive friction, through a cam 51 on the cam shaft actuating a bell crank 52, one arm 53 of which operates upon a collar 54 on the pivot 8. The collar 54 is adjustable through adjustment and lock nuts 55 employed for increasing or decreasing the tension of the spring 50. The bell crank 52 is pivoted as seen at 56.

It will be noted that water circulating passages 57 are arranged in the support 58 for the cylinder to keep the plunger 25 cool when in its retracted position, and also to have a cooling effect upon the cone or supplemental hopper 23 which does not directly contact the cylinder 14 as will be seen. This prevents any appreciable pre-heating of the material prior to its discharge into the cylinder and prevents congestion or clogging of the delivery into the cylinder through said cone 23.

It will be understood that each of the charges, for example at X, and at Y, and at Z, etc., will be less than the amount necessary to form the complete casting. As a matter of fact, in maintaining desirable functioning of the machine, it is advisable to have the collective volume of the series of charges employed equal to the volume of material utilized in forming each casting. However, should there be any surplus of material introduced in the charges, this would be compensated for by the second measuring control between the aperture 21 and the feed tube 23.

While in the present illustration of a performance of our method, it has been stated that the plunger operates to pressure discharge the heated material from the cylinder into the die in advancing the last charge, it is also possible to simply move the plunger rearwardly a slight degree and not sufficient to uncover the port 24, and then advance the plunger in pressure discharging the material from the cylinder. However, the method as previously described is preferred from the standpoint that the end of the plunger is operating upon the hard crystal materials rather than on a plastic or semi-plastic partially heated material, which might cause difficulty in maintaining not only a clean plunger but also a clean cylinder.

In illustrating one adaptation of the casting machine as disclosed in our prior application Ser. No. 152,942, a single operation of the plunger was disclosed which is suitable in forming small castings of the type and kind illustrated. However, in forming larger castings where a greater amount of casting material is required instead of simply providing a larger cylinder and waiting a relatively long period of time to heat material introduced into a large cylinder, we have conceived the method of introducing a series of small charges of material into a small cylinder prior to the pressure injection of the heated casting material into the impression of the die. In this way, relatively large castings can be formed quickly by reason of the quick melting down and sealing of the thermoplastic material made possible through this process. As before stated, the injection stroke of the plunger 25 forces the heated casting material into the impression 17 as seen at 58 in Fig. 2 of the drawing, and the measured portion of the powdered or granular thermoplastic material is delivered upon the plunger 25 as seen at 59, this material having entered the aperture 24 through the hopper 23, which is omitted in Figs. 2 to 5 inclusive for the sake of clarity.

On the backward movement of the plunger 25, the material 59 will drop into the bore 14a of the cylinder in the manner indicated in Fig. 1 of the drawing, and in the next forward movement of the plunger as is seen in Fig. 3 of the drawing, the material 59 will be stored in the heated end of the cylinder as diagrammatically illustrated at X. In this stroke of the plunger, another measured supply of material 59a has been fed to the aperture 24 and on the rearward stroke of the plunger, this material will drop into the bore 14a. On the next forward stroke of the plunger as seen in Fig. 4 of the drawing, this material will be advanced in the cylinder into a position substantially similar to that shown diagrammatically at Y in Fig. 4. Another supply of measured material 59b is delivered to the apperture 24. In the backward or return stroke of the plunger, the material 59b drops into the cylinder 14a forwardly of the plunger 25 as seen at Z in Fig. 5 of the drawing. In the next forward movement of the plunger, which at this time is actuated by the cam surface 49, the casting material will be injected into the die in the manner shown in Fig. 2, and the cycle of operation is then again repeated.

It will be understood that in the steps of advancing the material into the cylinder to the positions X, and Y, Figs. 3 and 4, the nozzle 15 will maintain the position shown in Fig. 3a of the drawing, and in fact, the nozzle will remain in this position until the plunger 25 is in position to begin the ejection of the casting material, at which period the nozzle 15 is moved into registering position with the admission port or orifice 17a opening into the impression 17 of the dies along the parting line of said dies.

It will be understood that after the casting had been formed, and incidentally, the casting may be formed on a suitable core 60, the dies will be separated to eject the casting from the dies leaving the casting supported on the core, after which, the casting may be stripped from the core. Our present invention does not deal with the steps of the process with respect to the handling or treatment of the finished casting, but is here concentrated to the novel method of intermittently feeding a series of measured charges of the casting material employed into the cylinder for the purposes stated. It will readily appear that by using this process, a small quantity of each individual charge when compacted in the cylinder as at X and Y, will not only establish a contact with the heated cylinder walls, but also with the body of the previously heated material so as to establish a substantially instantaneous melting or heating of the material; the heat flow being directly upon the surface of the material exposed to the previously heated material as well as at its peripheral engagement with the cylinder walls.

On the other hand, it will be understood that by reason of the fact that the forward end of the plunger engages the granular or powdered material in advancing the same in the cylinder, there will be no collection of the plastic material upon the plunger, or in fact, upon the cooled end of the cylinder to interfere with the free operation of the plunger. This powdered material will act in a fashion as a skid in advancing the material through the cylinder, and the nozzle in the injection stroke of the plunger, thus materially reducing the friction and minimizing the pressure required to accomplish the desired result. This result is also made possible by reason of the fact that small diameter cylinders are maintained, at least relatively small, as compared with the size of the castings being formed; in other words, the amount of material discharged from the cylinder.

The present illustration of our method in advancing two charges prior to the introduction of the final third charge and then pressure injecting casting material into the cylinder is only one of many possible adaptations of this method. In other words, a simple method would be to feed a single charge X into the cylinder and then feed the charge Y, and inject the casting material in the process of advancing the charge Y, rather than in advancing the charge Z. On the other hand, 3, 4 or more charges may be introduced into the cylinder before the final charge before injection. It will, of course, be apparent that where comparatively large castings are made, a longer time element will be allowed for the heating of the casting material by reducing the speed of operation of the machine.

This question of time factor can also be solved to maintain a relatively high casting rate of speed by incorporating the principles of the method disclosed in our application, Ser. No. 131,608, filed March 18, 1937, supported by the machine structure disclosed in our application Ser. No. 193,721, filed March 3, 1938, in which application the use of the dual cylinder is disclosed. This simply means that a cam would be employed for moving the frame 6 in two directions to bring a pair of cylinders into registering position with the dies on the injection stroke. In other words, while one cylinder is performing the injection operation, the other companion cylinder can be charging, and the material heated up proportionately to its charge. However, this particular principle of operation is not essential, except in making relatively large castings, unless it be desirable to increase the speed of production of small castings.

In a dual cylinder of the character above referred to, it will be understood that the method will be carried out by the use of a single cam as at 43, but instead of pressure injecting on the third charge Z, the injection would actually take place on a sixth charge. In other words, in one cycle of revolution of the machine, the material will be discharged from one cylinder when the plunger is actuated by the cam surface 49, and in the next cycle of operation, the material will be discharged from the other cylinder by the action of the cam surface 49. This surface would simply act as another feeding step in the cylinder, which is not registering with the die impression at the time. To express this in other words, it may be said that when one cylinder is being charged through the action of the cam surface 49, at that moment, the other fully charged cylinder will have the heated material discharged therefrom into the impression of the die.

With the different types of castings to be formed in accordance with the method, multi-color effects may be produced in the castings by simply inserting a mixture of several colors of the thermoplastic material in the hopper, and if desired, the ground color of the resulting castings may be controlled by incorporating a greater amount of one base color, and it may also be desirable to incorporate larger particles of the colors which are to appear on and over the surface of the ground color. Certain effects of this type may also be accomplished by the intermittent charging of the cylinder as at X, Y, and Z, with distinct colors or with predetermined combinations of colors in each charge.

It will be apparent that there is always a surplus mass of heated material in the discharge end of the cylinder sufficient to form at least one casting. The independent charges are for the purpose of replacing the material used in forming each casting.

Having fully described our invention, what we claim as new and desire to secure by Letters Patent is:

1. The method of die casting an article of thermoplastic material by feeding heated material by a plunger through the discharge end of a heated cylinder into a cavity, which comprises continuously heating the discharge end of the cylinder, sealing the discharge end of the cylinder and intermittently feeding small pre-measured portions of the material into the heated cylinder by intermittent strokes of said plunger so that each measured portion becomes quickly heated by contact with the walls of the heated cylinder and contact with heated material already in the discharge end portion of the cylinder, and then opening the discharge end of the cylinder and simultaneously therewith and by a single stroke of said plunger pressure injecting from the cylinder into the cavity a portion of said heated material sufficient to fill the cavity.

2. The method of die casting an article of thermoplastic material by feeding heated material by a plunger through the discharge end of a heated cylinder into a cavity, which comprises continuously heating the discharge end of the cylinder, sealing the discharge end of the cylinder and intermittently feeding small premeasured portions of the material into the heated cylinder by intermittent strokes of said plunger so that each measured portion becomes quickly heated by contact with the walls of the heated cylinder and contact with heated material already in the discharge end portion of the cylinder, then opening the discharge end of the cylinder and simultaneously therewith and by a single stroke of said plunger pressure injecting from the cylinder into the cavity a portion of said heated material sufficient to fill the cavity, and controlling the measured supply of material fed to the cylinder by the strokes of the plunger.

LOUIS H. MORIN.
DAVIS MARINSKY.